United States Patent Office 2,923,636
Patented Feb. 2, 1960

2,923,636

GLASS-MAKING FRIT AND METHOD

Arthur B. Swain, Toledo, Ohio, assignor to Owens-Illinois Glass Company, a corporation of Ohio No Drawing. Application April 6, 1959
Serial No. 804,142

12 Claims. (Cl. 106—52)

The instant invention relates to the manufacture of colored glass, particularly glasses having a green color, by a forehearth addition of a highly enriched colorant frit addition to a colorless base glass.

The present application is a continuation-in-part of my copending applications, Serial No. 661,303, filed May 24, 1957, and now abandoned and Serial No. 661,304, filed May 24, 1957, and now abandoned.

The invention employs a method wherein a clear or colorless flint glass usable for the manufacture of clear or colorless containers and containing specifically added decolorizers, such glasses being herein referred to as the "base glass," is melted and refined in a large tank or glass furnace. Colorant material of specified composition is added to and mixed with a molten stream of the clear decolorized base glass flowing from the tank through a forehearth channel, the composite colored glass being withdrawn from the channel to form mold charges used in the manufacture of colored bottles or other colored articles.

Such a method has important advantages over the prior methods for making colored glasses in which the colorant material is added to the base glass batch or introduced into the melting and refining tank. The most salient commercial advantage resides in the swift transition (in a matter of three hours or less) from a clear glass to a colored glass and vice versa, as contrasted with the previously required extended transition time (of from 1 to 3 days) required for the changing of colors in furnace-prepared colorant batches. Further, it permits clear and colored glassware to be made simultaneously on separate molding machines fed from the same tank through different forehearths. Further, smaller quantities of colorant materials are required by the present invention than by the known practice where the colorant is incorporated into the melter batch and the colorant and base batch are melted concurrently in the furnace melter with substantial losses of volatile colorant materials.

The colorant frit herein disclosed is "highly enriched" in that the frit composition contains colorant materials in much higher concentrations, actually on the order of 100 times greater, than the concentration of colorant ingredients added to the base glass batch for coloring according to the prior methods. As illustrative of such glass batch concentrations, reference is made to U.S. Patent No. 2,508,070 to Lyle and U.S. Patent No. 2,599,349 to Ricker. If colorant glass compositions such as taught by the prior art (e.g., Lyle and Ricker) merely were added in the forehearth according to the present invention in the amounts and rates herein taught, the base glass would not be colored appreciably and a commercially acceptable colored glass would not be obtained. Conversely, if the base glass in the melter were colored by the addition of the colorant ingredients in the proportions herein proposed for the frit, the glass produced would be overly colored and too dark and a commercially acceptable colored glass could not be obtained.

In the attempted addition of enriched colorant frits to present-day commercial base glasses in a forehearth, considerable difficulty has been experienced in obtaining composite glasses of commercially specified hues or colors. The use of common colorant materials, according to known batch melting techniques and in amounts consistent with previously used batch melting methods of making a green glass of a specific color, results in dull or murky glasses which are so low in purity and brightness as to be unsatisfactory. Accordingly, such glasses fail to meet customer specified color, brightness and purity standards for various green glasses, such as the Georgia green, or Rum green glasses mentioned specifically hereinafter.

It has been found that such difficulties in color quality were due to two factors, namely (1) the presence of decolorizers (such as selenium) and ferrous iron in the base glass, and (2) an improper oxygen balance on the reducing side of neutral in the finished unsatisfactory green glasses. To overcome these specific difficulties, it has been found that the availability of chromium in its most highly oxidized valence state, i.e., as the hexavalent $Cr^{+6}$, is essential in the frit, in order to make a resultant or composite final glass possessing the requisite color quality, as measured by the characteristics of high purity and low brightness in the specific dominant wave length range, demanded by customers.

Generally, the present invention proposes the use of an amount of hexavalent chromium ion-furnishing ingredients, e.g., potassium dichromate, in the highly enriched colorant batch sufficient to completely overcome the foregoing difficulties and to produce glasses of green color of pleasant appearance and possessing characteristics well within the color specifications set up commercially for Georgia green and Rum green colors.

The amount of potassium dichromate or equivalent source of $Cr^{+6}$ added is dependent primarily upon the amount of decolorizing ingredients and the amount of ferrous iron present in the base glass composition. However, other factors may govern the $Cr^{+6}$ content of the frit. For example, it has been found that other oxidizing agents, e.g., sodium nitrate, can be added to insure the presence of $Cr^{+6}$ in the frit and also to partially oxidize the decolorizer and/or ferrous iron content of the base glass and to reduce the requisite amount of dichromate, thereby preventing the necessity of adding in such large amounts as to prevent the obtaining of the desired color. Additionally, by providing an excess of $Cr^{+6}$ ions above that amount necessary for the complete oxidation of decolorizers and ferrous iron, a residual $Cr^{+6}$ content in the finished glass can be obtained, which $Cr^{+6}$ content possesses the property of remarkably increasing the opacity of the glass to ultra-violet radiation within the range of 300 mu millimicrons to 400 mu and particularly from 360 to 370 mu. The ultra-violet absorption characteristics of such glasses make them ideal for the packaging of ultra-violet light sensitive foods, beverages and the like.

It has been found that by the addition of a green colorant frit containing potassium dichromate and additional oxidizing agents to the base glass flowing in the forehearth channel the $CrO_3$ and other oxidants present in the colorant frit oxidizes the deleterious ingredients, specifically ferrous iron and selenium, present in the base glass. The oxidization of the ferrous iron ($Fe^{+2}$) to a higher valence state ($Fe^{+3}$) changes the color of the composite glass from a blue-green to a yellowish green, thereby increasing the light transmission (measured as "brightness") of the glass to produce a color of relatively low purity (2.0–5.0%) and high brightness (70–80%) in a specific dominant wave length of the spectrum.

It is, therefore, an important object of this invention to provide a method of making a colored glass by the addition to a colorless base glass of a highly enriched colorant frit containing hexavalent chromium.

Another, and equally important object, is the provision of a colorant frit composition which is essentially a soda-lime flint glass containing hexavalent chromium.

Still another salient object is the provision of a method wherein a colorant frit is added to a base glass to oxidize the ferrous iron content and the decolorizer content of the colorless base glass to yield a bright colored composite glass of low purity and high brightness in a specific dominant wave length.

It is a further object to provide a highly enriched colorant frit of basically soda-lime flint glass composition containing $CrO_3$ and an oxidizing agent.

Yet another object resides in the method wherein a $Cr^{+6}$ containing frit is added to a decolorized base glass to form an ultra-violet absorbent glass containing at least a trace of residual $Cr^{+6}$.

It is an additional and important object of the instant invention to provide a method whereby a molten colorless base glass is converted to a green composite glass by the addition of a granulated frit of a composition compatible with the base glass and containing colorants in a concentration on the order of 50 to 100 times as great as in the finished glass.

PREPARATION OF BASE GLASS

The base glass preferably used in practicing the present invention is essentially a conventional glass of the type commonly utilized in the manufacture of colorless or "milk-bottle pink" containers. The oxides and the ranges of percentages thereof fall within the following ranges:

Table I

| Oxide: | Percent by Weight |
|---|---|
| $SiO_2$ | 60 to 75 |
| $Al_2O_3$ | 0.3 to 10 |
| $CaO+MgO$ | 6 to 15 |
| $Na_2O$ | 12 to 18 |
| $K_2O$ | .0 to 5 |
| $BaO$ | .0 to 5 |
| Se | 0.00025 to 0.00035 |

The following Examples I and II are soda-lime flint batches which may be used in making the molten base (clear) glass in the present invention:

Table II

| | Example I | Example II |
|---|---|---|
| | Percent | Percent |
| $SiO_2$ | 72.01 | 71.45 |
| $Al_2O_3$ | 1.74 | 1.32 |
| $Fe_2O_3$ | .039 | .037 |
| $TiO_2$ | .029 | .013 |
| CaO | 11.38 | 8.32 |
| MgO | 1.15 | 5.58 |
| Alkalis | 13.65 | 13.28 |
| Selenium | 0.00025 to 0.00030 | 0.00025 to 0.00035 |

The conditions and procedures for making such molten base glasses are conventional and such conditions are well known to those skilled in the art, as exemplified in Table IX, B–11, on page 245 of "Handbook of Glass Manufacture," by Tooley, Ogden Publishing Co., New York, N.Y., 1953.

Generally the base glass issues from the melting tank or refiner and enters the forehearth at a temperature of from about 2300° F. to about 2600° F., and this temperature is well adapted for the addition of the frit which is in finely divided form, e.g., of from −8 to +30 mesh. In some instances, it was found that frit dispersion was enhanced by increasing the forehearth temperatures at the point of addition. For example, a melter tank temperature of 2280° F. may be increased to a temperature of 2350° F. at the forehearth addition point and the temperatures thereafter diminished along the length of the forehearth to a forehearth outlet temperature of 2070° F. A forehearth suitable for such operation is fully disclosed in the co-pending application of Rough and Swain, Serial No. 578,632, assigned to the assignee of the present invention.

It will be noted that the base glass compositions each contain selenium, as is common in colorless or "pink" flint glass compositions, and ferrous ($Fe^{++}$) iron as an impurity although the indicated analysis lumps all the iron content as calculated $Fe_2O_3$. The FeO content usually introduced as a sand impurity, is limited to less than about 0.02% by weight as a quality control measure.

As indicated in the disclosure in said application, the frit composition is prepared by melting in a separate unit melter or day tank in which the frit composition is melted under oxidizing fining conditions (oxidizing atmosphere in melter), such melt being carried on so that the glass temperature of the melted frit is in the range 2700–2780° F. The melted colorant frit is fed as a molten stream from an outlet from the melter and chilled rapidly, such as by feeding it into a body of water, so that the frit breaks up into granulated form. A suitable frit making apparatus is disclosed in William B. Silverman application Serial No. 718,024, filed February 27, 1958. The granulated colorant frit in dried granular form is fed to the forehearth of the main tank for colorizing the clear base glass, as disclosed in Albert G. Lauck, Serial No. 552,869, filed December 13, 1955.

DESIRED FINAL GLASS OPTICAL PROPERTIES

In the manufacture of colored glasses, and particularly green glasses, certain specified color standards must be met. Such standards are usually defined as "purity" at the dominant wave length of the glass and the "brightness" of the glass.

The "purity" of the glass as used herein specifies that percentage of the light transmitted that is within the dominant wave length range for a particular glass color. The glass absorbs the remaining light of that wave length. For example, using a Georgia green glass of commercially acceptable specification, light of the wave length 515–545 millicrons is the dominant wave length range of the light of that color and if "purity" is indicated as 5%, this means 5% of the light of that dominant wave length range is being transmitted by the glass. The remaining 95% of that wave length is absorbed by the glass.

"Brightness," on the other hand, as referred to herein, is stated as a percentage of total light transmission by the glass. If Georgia green glass has a 75% brightness characteristic, it transmits 75% of the light of all wave lengths.

The light transmission requirements for Georgia green glass are as follows:

Dominant wave length (DW)
                          millicrons (mu)__515 to 545
Purity _____ percent__ 2.0 to 5
Brightness _____ do____ 70 to 80

The light transmission requirements for Rum green glass are as follows:

Dominant wave length (DW) _____ mu__ 542 to 555
Purity _____ percent__ 6 to 8
Brightness _____ do____ 67 to 70

SPECIFIC FRIT AND COMPOSITE GLASS COMPOSITIONS

As above explained, the frit compositions must be capable of (1) effectively nullifying the normally present decolorizers and iron impurities in the composite glass, (2) presenting a proper oxygen balance in the finished composite glass and (3) forming a composite glass of the requisite color characteristics.

The following frit compositions are capable of forming such composite glasses:

EXAMPLE III
FRIT BATCH A

| Ingredient: | Pounds |
|---|---|
| Sand | 2000 |
| Soda ash | 675 |
| Hi calcium limestone | 632 |
| Sodium nitrate | 40 |
| Iron chromite | 75 |
| Potassium dichromate | 30 |
| Cobalt oxide | 3.25 |

The theoretical composition of the glass which would be produced by melting the above batch is as follows:

THEORETICAL BATCH COMPOSITION OF FRIT A

| | Percent |
|---|---|
| $SiO_2$ | 70.4 |
| $Al_2O_3$ | .56 |
| $Fe_2O_3$ | .79 |
| $TiO_2$ | .069 |
| CaO | 12.03 |
| MgO | .44 |
| $Na_2O$ | 13.84 |
| $K_2O$ | .35 |
| Total chromium, as $Cr_2O_3$ | 1.69 |
| $Co_3O_4$ | 0.113 |

In the above composition, frit A 68% of the total chromium is supplied by the iron chromite and 32% is obtained from the potassium dichromate.

The $Al_2O_3$ and the $TiO_2$ appearing in the above theoretical composition frit A are present in the sand of the colorant batch. The $Al_2O_3$ also exists as an impurity in the iron chromite and limestone used in the colorant batch; and, hence, is present in the theoretical composition. The MgO is present as a magnesium carbonate, $MgCO_3$, in the limestone of the colorant batch.

An oxide based analysis of the high calcium limestone of frit A and the other frits herein disclosed is as follows:

| | Percent |
|---|---|
| $SiO_2$ | 0.50 |
| $Al_2O_3$ | 0.18 |
| $Fe_2O_3$ | 0.05 |
| CaO | 53.27 |
| MgO | 2.00 |
| $SO_3$ | 0.04 |
| Fusion loss | 43.96 |
| | 100.00 |

The above frit A was analyzed in its final, pulverized form and was found to contain:

| Total chromium oxides | 1.42% (as $Cr_2O_3$). |
|---|---|
| $CrO_3$ | 0.46%. |
| $Co_3O_4$ | 0.092%. |

On addition of 17.5 pounds of frit A per ton of molten colorless glass made as per Example I of Table II, a satisfactory Georgia green glass was made containing 0.015% $Cr_2O_3$ in the finished glass. The addition conditions and a preferred addition apparatus is disclosed in detail in the copending application of Rough and Swain, Serial No. 578,632, filed April 17, 1956, and assigned to the assignee of the present invention.

EXAMPLE IV
FRIT BATCH B

| Ingredient: | Pounds |
|---|---|
| Sand | 2000 |
| Soda ash | 656 |
| Hi cal limestone | 632 |
| Iron chromite | 65 |
| Potassium dichromate | 40 |
| Cobalt oxide | 3.25 |
| Sodium nitrate | 45 |

The above frit was analyzed and was found to actually contain:

| Total chromium oxides | 1.45% (as $Cr_2O_3$). |
|---|---|
| $CrO_3$ | 0.59%. |
| CoO | 0.09%. |

On the addition of 20.5 pounds of frit B per ton of molten colorless glass of Example I, an ideal Georgia green glass was obtained having the following transmission characteristics:

| DW | mu | 537 |
|---|---|---|
| Purity | percent | 3.4 |
| Brightness | do | 78.1 |

EXAMPLE V
FRIT BATCH C

| Ingredient: | Pounds |
|---|---|
| Sand | 2000 |
| Soda ash | 656 |
| Hi cal limestone | 632 |
| Sodium nitrate | 60 |
| Iron chromite | 58 |
| Potassium dichromate | 49½ |
| Cobalt oxide | 2.8 |

THEORETICAL—FRIT BATCH C

| $SiO_2$ | 69.94 |
|---|---|
| $Al_2O_3$ | .47 |
| $Fe_2O_3$ | .62 |
| $TiO_2$ | .069 |
| CaO | 12.00 |
| MgO | .38 |
| Alkalies | 14.63 |
| $Cr_2O_3$ | 1.78 |
| $Co_3O_4$ | .098 |

Four individually prepared samples of the above frit C were analyzed and were found to actually contain:

| Total chromium oxides | 1.30 to 1.46% (as $Cr_2O_3$). |
|---|---|
| $CrO_3$ | 0.38 to 0.58%. |
| CoO | .075 to .082%. |

On addition of from 20 to 24 pounds of frit C per ton of molten colorless glass made as per Example I of Table II, a satisfactory Georgia green glass was made. The composite colored glass contained:

| | Percent |
|---|---|
| Total iron as $Fe_2O_3$ | 0.054 |
| Total iron in FeO | 0.000 |
| Total chromium as $Cr_2O_3$ | 0.021 |
| Total chromium as $CrO_3$ | 0.00049 |
| Total cobalt as CoO | 0.0009 |

This finished Georgie green glass possessed substantial opacity to ultra-violet light as compared to a melt-batch prepared conventional Georgia green.

SPECTROPHOTOMERIC ANALYSIS

| Identity | Percent T at 360 Mu | Percent T at 370 Mu |
|---|---|---|
| Conventional Melt Batch of Ga. Green Glasses | 74.0–75.1 | 79.4–80.7 |
| Composite Glasses Containing Frit C | 3.1–3.7 | 3.5–4.7 |

EXAMPLE VI
FRIT BATCH D

| Ingredient: | Pounds |
|---|---|
| Sand | 2000 |
| Soda ash | 675 |
| Hi cal limestone | 632 |
| Sodium nitrate | 40 |
| Iron chromite | 81 |
| Potassium dichromate | 25 |
| Cobalt oxide | 2.88 |

THEORETICAL BATCH D

| Ingredient | |
|---|---|
| SiO$_2$ | 69.81 |
| Al$_2$O$_3$ | .59 |
| Fe$_2$O$_3$ | .84 |
| TiO$_2$ | .068 |
| CaO | 11.97 |
| MgO | .46 |
| CrO$_3$ | 1.69 |
| Co$_3$O$_4$ | .100 |
| Alkalies | 14.45 |

The above frit D was analyzed and was found to actually contain:

| | |
|---|---|
| Total chromium oxides | 1.42% (as Cr$_2$O$_3$). |
| CrO$_3$ | 0.32%. |
| CoO | .096%. |

On addition of from 43 to 60 pounds of frit D per ton of molten colorless glass made as per Example I of Table II, a satisfactory Rum green glass was obtained having the following colorant content:

| | Percent |
|---|---|
| Total iron as Fe$_2$O$_3$ | 0.070 |
| Total iron as FeO | 0.000 |
| Total chromium as Cr$_2$O$_3$ | 0.037 |
| Total chromium as CrO$_3$ | 0.0073 |
| Total cobalt as CoO | 0.0013 |

The composite Rum green glass had the following transmission characteristics:

| | |
|---|---|
| DW | mu 560.4 |
| Purity | percent 11.3 |
| Brightness | do 69.0 |

Also, the finished Rum green glass possessed substantial ultra-violet light opacity, by comparison as follows:

| Identity: | Percent T at 360 mu |
|---|---|
| Conventional melt batch Rum green glass | 78.0 |
| Composite glass containing frit D | 0.07 |

EXAMPLE VII
FRIT BATCH E

| Ingredient: | Pounds |
|---|---|
| Sand | 2000 |
| Soda ash | 656 |
| Limestone | 632 |
| Sodium nitrate | 40 |
| Potassium dichromate | 30 |
| Cobalt oxide | 3.25 |
| Iron chromite | 75 |

THEORETICAL FRIT BATCH E

| Ingredient | Percent by wt. |
|---|---|
| SiO$_2$ | 70.11 |
| Al$_2$O$_3$ | 0.56 |
| Fe$_2$O$_3$ | 0.79 |
| TiO$_2$ | 0.069 |
| CaO | 12.03 |
| MgO | 0.44 |
| Alkalies | 14.19 |
| Cr$_2$O$_3$ | 1.69 |
| Co$_3$O$_4$ | 0.113 |

Upon analysis, four individually prepared samples of the final frit contained:

| | |
|---|---|
| Total chromium oxides | 1.34 to 1.53% (as Cr$_2$O$_3$). |
| CrO$_3$ | 0.42 to 0.48%. |
| CoO | 0.081 to 0.093%. |

On addition of 16.5 pounds of a representative mixed batch of frit E per ton of glass, an excellent Georgia green glass was obtained having the following transmission characteristics as determined by 9 samples averaging:

| | |
|---|---|
| DW | 533 |
| Purity | percent 2.6 |
| Brightness | do 77.8 |
| Percent T at 1000 mu | do 84.8 |

EXAMPLE VIII
FRIT BATCH F

| Ingredient: | Pounds |
|---|---|
| Sand | 2000 |
| Soda ash | 675 |
| Limestone | 632 |
| Sodium nitrate | 40 |
| Iron chromite | 92.5 |
| Potasisum dichromate | 15 |
| Cobalt oxide | 2.38 |

Upon analysis, it was found that the final frit contained:

| | Percent |
|---|---|
| Total chromium oxides | 1.42 |
| CrO$_3$ | 0.41 |
| Co$_3$O$_4$ | 0.075 |

The light transmission qualities of a composite Rum green glass made by the addition of from 41 to 43 pounds of frit F to base glass of Example I of Table II were:

| Sample No. | DW | Purity | Brightness | T at 1,000 Mu |
|---|---|---|---|---|
| | | Percent | Percent | Percent |
| 1 | 552 | 7.3 | 67.6 | 90.9 |
| 2 | 551 | 7.2 | 67.6 | 90.9 |
| 3 | 552 | 6.2 | 71.0 | 88.0 |
| 4 | 548 | 7.1 | 69.9 | 91.0 |
| 5 | 545 | 5.6 | 71.2 | 90.0 |

Additionally, the samples 1–5 were all quite opaque to ultra-violet light.

SUMMARY

From the foregoing data, it will be appreciated that the present invention provides a method of manufacturing colored glasses of specified color and transmission characteristics by the forehearth addition of a highly enriched colorant frit.

The frit ingredients include a Cr$^{+6}$ furnishing ingredient, such as potassium dichromate as an essential ingredient, preferably with an additional oxidizing agent, such as sodium nitrate to insure the presence of oxidized Cr$^{+6}$ in the frit, even though ferrous iron is in the frit batch ingredients. The amount of the Cr$^{+6}$ ingredient is sufficient to yield a CrO$_3$ content in the final frit of from 0.20 to 0.70% by weight.

To make a specific color, an additional chromium furnishing ingredient, such as iron chromite, may be added. For example, in making Georgia green and Rum green glasses, the frit should contain sufficient chromium to provide in the composite glass total chromium oxides on the order of from 0.015 to 0.26%, calculated as Cr$_2$O$_3$.

The ratio of Cr$^{+6}$ and Cr$^{+3}$ furnishing ingredients in the frit will vary in accordance with the ferrous iron content of the base glass to which the frit is to be added, and the amount of Cr$^{+6}$ in the frit varying directly with the ferrous iron content thereof.

The amount of frit added must insure the addition of sufficient hexavalent chromium, together with any additional oxidizing agent, to at least substantially oxidize the ferrous iron to ferric iron and to completely oxidize the selenium to a colorless oxidation state. The simultaneous presence of ferrous iron and residual hexavalent chromium in either the frit or the finished glass is impossible, and consequently the amount of a frit containing a given amount of Cr$^{+6}$ added to the base glass is largely determined by (1) the ferrous iron content of the base glass and (2) whether residual hexavalent chromium is desired in the composite glass.

The amount of frit added also varies directly with the amount of residual Cr$^{+6}$ to be present in the final or composite glass composition. If a "normal," i.e., a non-ultraviolet absorbing final glass is desired, as for example in Georgia green glasses of the type prepared from frits A and E, then the final glass contains no residual Cr$^{+6}$.

However, if a residual Cr⁺⁶ content is desired to obtain the ultra-violet absorbing feature of frits B through D and F, then a greater amount of frit or a frit containing more $Cr^{+6}$ is added.

Thus, the method may be defined as including the steps of flowing a colorless molten flint glass through a forehearth, the glass containing ferrous iron and selenium, adding thereto an amount of granular frit containing an oxidizing agent and a $Cr^{+6}$ containing ingredient sufficient to oxidize the ferrous iron to ferric iron, thus reducing the FeO content to less than about 0.015% and to completely oxidize the selenium to a colorless valence state, and thoroughly mixing the base glass and the frit to form a homogeneous colored composite glass in which the selenium is present only in an oxidized valence state at which the selenium is colorless. Numerically, the amount of frit added ranges from 1% to 2.5% by weight of the molten glass. The base glass to frit ratio thus varies from 100:1 to 40:1.

The frit compositions of the present invention may be defined as granular lime-soda flint glass base frits made from a batch containing as the glass-forming constituents:

| Ingredient: | Percent by weight |
|---|---|
| $SiO_2$ | 60–75 |
| $Al_2O_3$ | 0–10 |
| CaO+MgO | 6–15 |
| $Na_2O$ | 12–18 |
| $K_2O$ | 0–5 |
| BaO | 0–5 | and containing substantially the following active ingredients in substantially the following amounts per ton of sand in the frit batch:

| Ingredient: | Pounds |
|---|---|
| Sodium nitrate | 40–60 |
| Iron chromite | 58–92.5 |
| Potassium dichromate | 15–49.5 |

Preferably the final frit is a lime-soda flint glass containing the following colorants in substantially the following amounts by weight:

| | |
|---|---|
| Total chromium | 1.30–1.53% (as $Cr_2O_3$). |
| $CrO_3$ | 0.2%–0.9%. |
| CoO | 0.075%–0.096%. |

The final glass compositions are essentially lime-soda flint glasses having minor colorant constituents and the following major oxides:

| Oxide: | Percent by weight |
|---|---|
| $SiO_2$ | 60–75 |
| $Al_2O_3$ | 0.3–10 |
| CaO+MgO | 6–15 |
| $Na_2O$ | 12–18 |
| $K_2O$ | 0–5 |
| BaO | 0–5 |

As additional colorant oxides the final composite glass article generically preferably contains:

| | |
|---|---|
| Total iron | 0.054 to 0.070% (as $Fe_2O_3$) |
| Total iron | None to 0.011% (as FeO) |
| Total chromium | 0.015 to 0.26% (as $Cr_2O_3$) |
| $CrO_3$ | None to 0.01% |
| CoO | 0.009 to 0.0013% |

Preferred specific colored glasses contain:

Normal Georgia green:

| | |
|---|---|
| Total iron | 0.010 to 0.011% (as FeO) |
| $Cr_2O_3$ | 0.015 to 0.021% |
| $CrO_3$ | 0.000 |
| CoO | 0.0009 to 0.0013% |

Normal Rum green:

| | |
|---|---|
| Total iron | 0.007% (as FeO) |
| $Cr_2O_3$ | 0.031% |
| $CrO_3$ | 0.000 |
| CoO | 0.0013% |

Ultra-violet absorbent Georgia green:

| | |
|---|---|
| $Fe_2O_3$ | 0.054% |
| Total chromium | 0.021% (as $Cr_2O_3$) |
| $CrO_3$ | Trace to 0.0007% |
| CoO | 0.0009% |
| FeO | None |

Ultra-violet absorbent Rum green:

| | |
|---|---|
| $Fe_2O_3$ | 0.070% |
| $Cr_2O_3$ | 0.037% |
| $CrO_3$ | 0.00073 to 0.001% |
| CoO | 0.0013% |
| FeO | None |

While preferred embodiments have been described above in detail, it will be understood that numerous modifications might be resorted to without departing from the scope of the invention as defined in the following claims.

What is claimed is:

1. In a method of making an ultra-violet light absorbent colored soda-lime flint glass, the steps of preparing a molten colorless soda-lime flint base glass containing ferrous iron as an impurity and selenium as a decolorizer, flowing the molten base glass through a forehearth, adding to the molten glass in the forehearth a highly enriched colorant frit of essentially soda-lime flint glass composition containing an oxidizing agent and residual $CrO_3$, and forming a composite colored glass, the amount of frit added being sufficient to yield at least a trace and not more than 0.01% residual $CrO_3$ in the composite glass.

2. A frit composition comprising a granular lime-soda flint glass prepared from a glass batch in which the active ingredients consist essentially of the following amounts per ton of sand in the batch:

| Ingredient: | Pounds |
|---|---|
| Sodium nitrate | 40–60 |
| Iron chromite | 58–92.5 |
| Potassium dichromate | 15–49.5 |

3. In a method of making an ultra-violet light absorbent colored soda-lime flint glass, the steps of preparing a molten colorless soda-lime flint base glass containing ferrous iron as an impurity and selenium as a decolorizer, flowing the molten base glass through a forehearth, adding to the molten glass in the forehearth a highly enriched colorant frit of essentially soda-lime flint glass composition containing 0.2 to 0.9% residual $CrO_3$ and forming a composite colored glass, the amount of frit added being sufficient to yield from at least a trace to not more than 0.01% residual $CrO_3$ and no residual ferrous iron in the composite glass.

4. A frit composition comprising a granular lime-soda flint glass which is highly colorant enriched with the following colorants in the following amounts by weight:

| | Percent |
|---|---|
| Total chromium oxides | 1.30–1.53 |
| $CrO_3$ | 0.2–0.9 |
| CoO | 0.075–0.096 |

5. In a method of making a colored soda-lime flint glass, the steps of preparing a molten colorless soda-lime flint base glass containing selenium as a decolorizer, flowing the molten base glass through a forehearth, adding to the molten glass in the forehearth a highly enriched colorant frit of essentially soda-lime flint glass composition containing residual $CrO_3$, and forming a composite colored glass, the amount of frit added ranging from 1% to 2.5% by weight of the molten base glass.

6. In a method of making a colored soda-lime flint glass, the steps of melting and refining a colorless soda-lime base glass containing ferrous iron as an impurity and selenium as a decolorizer, flowing the colorless base glass through a forehearth, adding to the molten glass at the forehearth an amount of a granular highly enriched colorant frit of essentially soda-lime flint glass composition containing an oxidizing agent and a $Cr^{+6}$ furnishing ingredient in amount sufficient to yield from 0.2 to 0.9%

$CrO_3$ in the frit, the amount of frit added ranging from 16.5 to 60 pounds of frit per ton of molten glass, and admixing the base glass and the frit to form a homogenous, colored composite glass.

7. A frit composition comprising a granular lime-soda flint glass which is highly colorant enriched and which contains at least 0.2% $CrO_3$.

8. In a method of making a colored soda-lime flint glass, the steps of melting and refining a colorless soda-lime base glass, flowing the colorless base glass through a forehearth, adding to the molten glass at the forehearth an amount of a granular highly enriched colorant frit of essentially soda-lime flint glass composition containing an oxidizing agent and a substantial residual $Cr^{+6}$ content, the base glass to frit ratio varying from 100:1 to 40:1, and admixing the base glass and the frit to form a homogeneous, colored composite glass.

9. A frit composition comprising a granular lime-soda flint glass which is highly colorant enriched and which contains no residual ferrous iron, at least 0.2% $CrO_3$, and at least 0.075% CoO.

10. In a method of making a colored soda-lime flint glass highly absorbent of light in the ultra-violet range, the steps of melting and refining a colorless soda-lime base glass containing ferrous iron as an impurity and selenium as a decolorizer, flowing the colorless base glass through a forehearth, adding to the molten glass at the forehearth an amount of a granular highly enriched colorant frit of essentially soda-lime flint glass composition containing an oxidizing agent and a $Cr^{+6}$ furnishing ingredient, the amount of frit added being sufficient to completely oxidize the ferrous iron of the base glass to $Fe_2O_3$ and to completely oxidize the selenium of the base glass to a colorless valence state, and admixing the base glass and the frit to form a homogeneous, colored composite glass containing from a trace to less than 0.01% $CrO_3$.

11. In a method of making a colored soda-lime flint glass, the steps of melting and refining a colorless soda-lime base flint glass containing ferrous iron as an impurity and selenium as a decolorizer, flowing the colorless base glass through a forehearth, adding to the molten glass at the forehearth an amount of a granular highly enriched colorant frit of essentially soda-lime flint glass composition containing an oxidizing agent and a $Cr^{+6}$ furnishing ingredient, the amount of frit added being sufficient to oxidize the ferrous iron of the base glass to less than 0.015% FeO and to completely oxidize the selenium of the base glass to a colorless valence state, and admixing the base glass and the frit to form a homogeneous, colored composite glass.

12. A frit composition comprising a granular lime-soda flint glass which is highly colorant enriched and which consists essentially of the following ingredients in the indicated percentages by weight:

| Ingredient: | Percent by weight |
| --- | --- |
| $SiO_2$ | 60–75 |
| $Al_2O_3$ | 0–10 |
| CaO+MgO | 6–15 |
| $Na_2O$ | 12–18 |
| $K_2O$ | 0–5 |
| BaO | 0–5 |
| Total chromium oxides | 1.30–1.53 |
| $CrO_3$ | 0.2–0.9 |
| CoO | 0.075–0.096 |

References Cited in the file of this patent

UNITED STATES PATENTS

| | | |
| --- | --- | --- |
| 2,229,416 | Lyle | Jan. 21, 1941 |
| 2,599,349 | Ricker | June 3, 1952 |